May 7, 1940.　　　　L. W. BROOKS　　　　2,200,020
LOADING, HAULING, AND DUMPING APPARATUS
Filed May 19, 1938　　　3 Sheets-Sheet 2
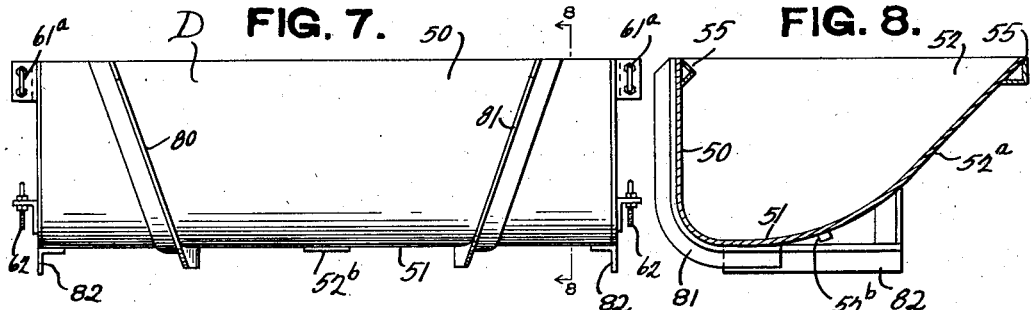
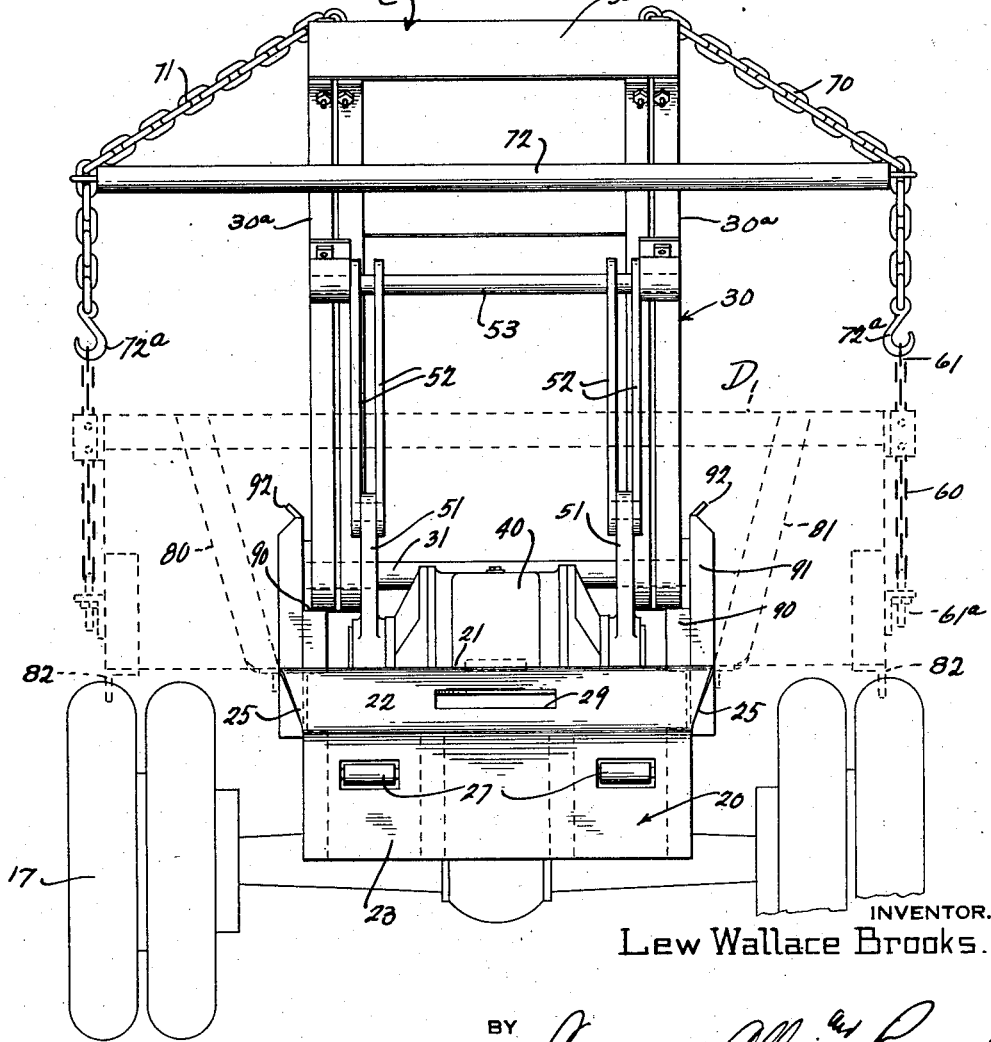
INVENTOR.
Lew Wallace Brooks.
BY
ATTORNEYS.

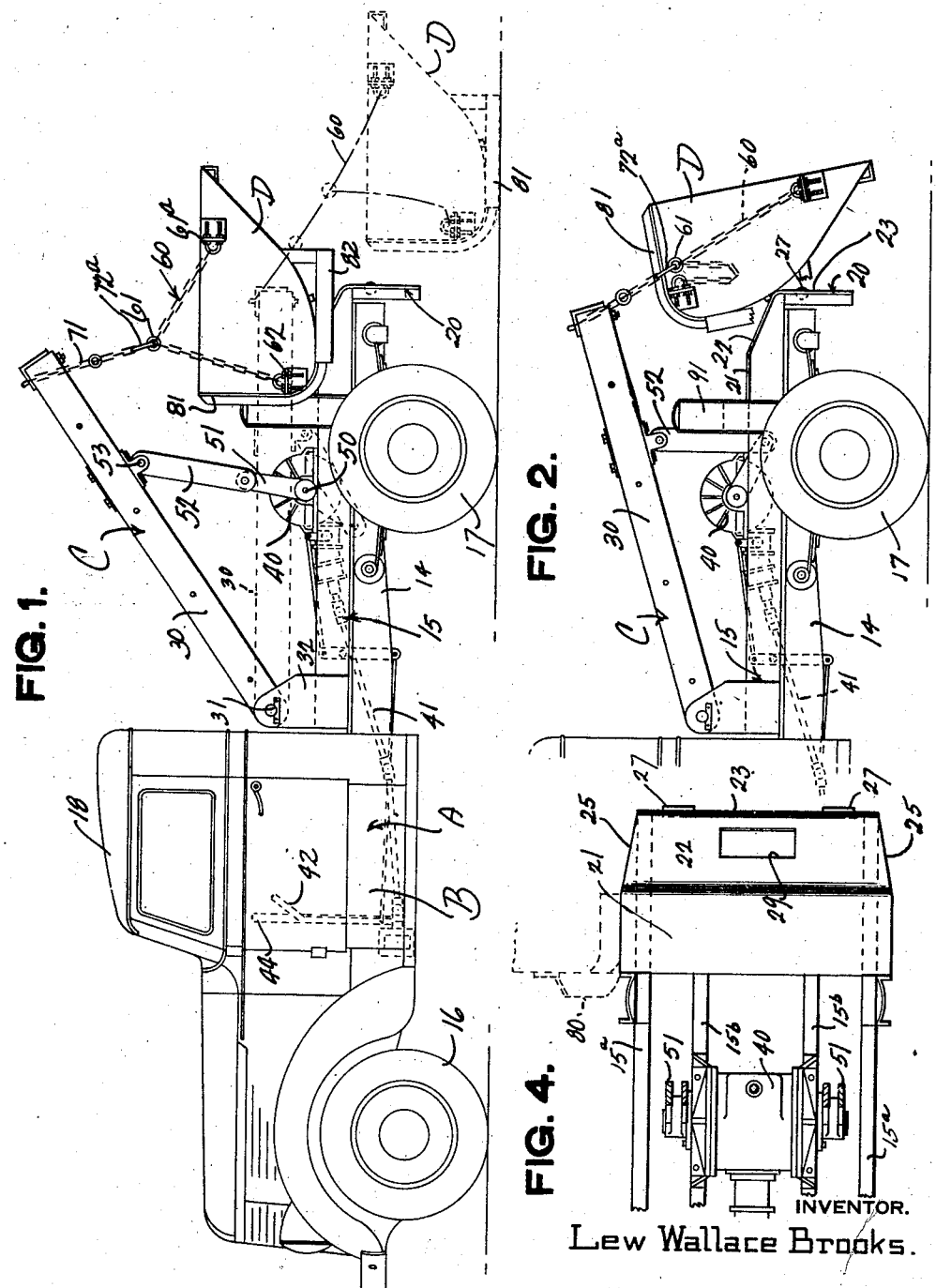

May 7, 1940.  L. W. BROOKS  2,200,020
LOADING, HAULING, AND DUMPING APPARATUS
Filed May 19, 1938   3 Sheets-Sheet 3

INVENTOR.
Lew Wallace Brooks.
BY
ATTORNEYS.

Patented May 7, 1940

2,200,020

UNITED STATES PATENT OFFICE 2,200,020

LOADING, HAULING, AND DUMPING APPARATUS

Lew Wallace Brooks, Knoxville, Tenn.

Application May 19, 1938, Serial No. 208,935

10 Claims. (Cl. 214—120)

This application relates to improvements in loading, transporting, and dumping apparatus.

The primary object of this invention is the provision of improved apparatus for the hauling of materials wherein a single vehicle with a hoist mechanism is employed to economically and efficiently load, transport, and dump skips, buckets, removable truck bodies or other apparatus loaded with the desired material.

A further object of this invention is the provision of an improved hoist mechanism for loading, hauling, and dumping materials, which is of a sturdy and efficient nature and adapted to be used in connection with an improved skip mechanism.

A further object of this invention is the provision of an improved hoist mechanism for hauling apparatus, which does away with the use of high pressure hose, cables, and winches.

A further object of this invention is the provision of improved truck and hoist mechanism adapted to be used with skips for the loading, hauling, and dumping of materials, and which dispenses with the use of counterweight means on the front of the truck; the load being hoisted, transported, and dumped without unnecessary strains upon the truck chassis or hoisting mechanism.

A further object of this invention is the provision of an improved skip or apparatus of the type hereinafter referred to.

A further object of this invention is the provision of an improved truck hoisting mechanism and cooperative skip construction adapted to hoist, transport and automatically dump materials at low operating cost.

A still further object of the invention is the provision of an improved loading, supporting, and dumping unit which may be readily installed upon a truck chassis and operated from the truck engine.

Other objects and advantages of the invention will be apparent during the course of the following detailed description.

In the accompanying drawings, forming a part of this specification, and wherein similar reference characters designate corresponding parts throughout the several views, Figure 1 is a side elevation of the improved load hoisting, hauling, and dumping mechanism, showing the hoist structure on a truck chassis with the skip in load hauling position, and showing in dotted lines the skip in filling position upon the ground just prior to loading of the skip on the truck.

Figure 2 is a fragmentary view of the rear end of the truck chassis and hoisting mechanism, showing the skip in load dumping position.

Figure 3 is an enlarged rear elevation of the improved truck chassis and hoisting mechanism showing the latter in elevated position.

Figure 4 is a fragmentary plan view of the rear skip supporting apron structure on line 4—4 of Figure 6 and also showing the hoisting mechanism.

Figure 7 is a front view of the skip, showing the guide angles thereon which are adapted to center the skip as it is being loaded upon the truck.

Figure 8 is a sectional view taken through the skip construction substantially on the line 8—8 of Figure 7 and showing the rests or supports for the retaining skip upright while resting upon the ground.

Figure 5:
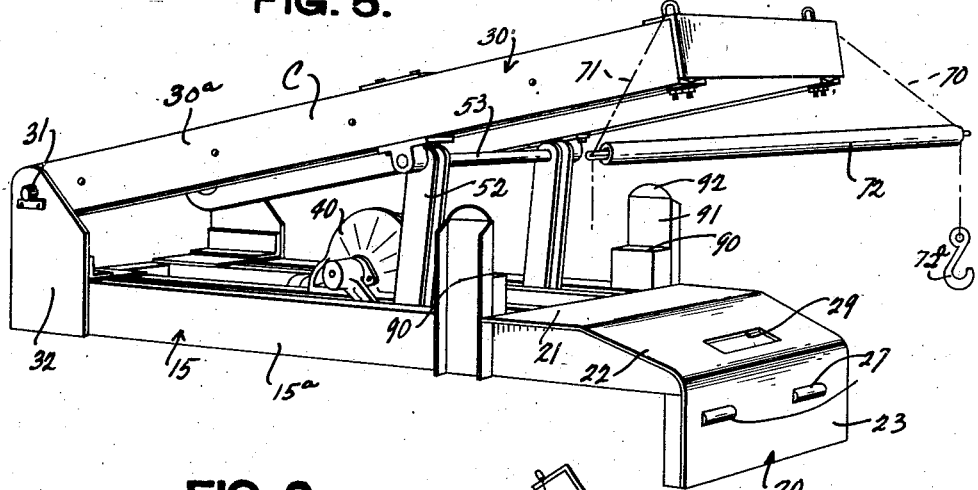
Figure 5 is a perspective view looking at the rear end of the sub-frame and the cooperative parts of the skip supporting apron and the hoist mechanism.

In the drawings, wherein for the purpose of illustration is shown only a preferred embodiment of the invention, the letter A generally designates the improved loading, hauling, and dumping mechanism which may consist of a truck B, load or skip handling mechanism C, and a skip construction D.

The truck B may be of any approved type and of course includes a chassis 14 having front running gear 16 and rear running gear 17, with an engine at the front of the cab structure 18 over the front running gear. The drive of the vehicle may be of any approved nature; preferably rear running gear drive so that a suitable power take-off may be used to operate the mechanism C.

The load or skip handling mechanism C includes a sub-frame 15, having pivoted thereon a boom or hoist frame construction 30 adapted to be raised and lowered by suitable hydraulic gear mechanism 40. The sub-frame 15 includes suitable side rails 15ª provided with suitable cross bracing, and parallel support rails 15ᵇ disposed between the side rails. This sub-frame 15 is mounted and secured upon the truck chassis 14 rearwardly of the cab 18 with the rear end of the frame substantially aligning with the rear end of the chassis.

Figure 9:
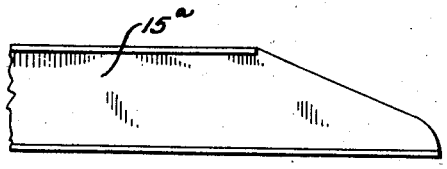
Figure 9 is an inner side elevation of one side rail of the sub-frame, at the rear end thereof.

The rear end of the sub-frame 15 is suitably equipped with a skip cooperating loading and supporting apron 20 which includes a horizontal top platform 21 sloped at 22 to the rear of the frame and terminating in a depending vertical apron portion 23. This portion 23 may be narrower in width than the portions 21 and 22, as can best be seen from Figures 3 and 4; the sloping portion 22 being widened at 25, so as to cooperate with the structure of the skip in properly centering the latter as it is loaded. The apron structure 20 is formed of sheet metal and may be suitably reinforced and is preferably welded to the rear ends of the frame side rails 15ᵃ, which are shaped as shown in Figure 9. Suitable angles may bolt the apron to the side rails in lieu of welding, if desired.

The apron portion 23 is provided with suitable rollers 27 mounted on horizontal axes and projecting beyond the rear face of the apron in order to facilitate elevation and loading of the skip structure, as will be subsequently referred to. The sloping portion 22 of the apron construction is provided with a suitable opening 29 which cooperates with a suitable projection on the skip, to be subsequently described, in automatically tipping the skip to a dumping position as the hosting mechanism lowers the skip for such purpose.

Referring to the boom or hoist frame mechanism 30, the same includes a rigid hoist frame construction of rectangular shape, including side rails 30ᵃ and a rear cross angle or channel; the frame structure being pivoted at 31 on suitable uprights 32 secured on the forward end of the frame 15 to be disposed at a point above the chassis 14 and preferably at a point rearwardly of the half-way distance between the front and rear running gear. The boom or hoist frame 30 extends at its rear end to a position about flush with the rear end of the chassis of the vehicle, when the hoist frame 30 is lowered.

The hoisting mechanism includes a suitable hydraulic motor or gear mechanism 40, mounted upon the support rails 15ᵇ to be disposed at a point above and slightly forward of the rear running gear when the unit C is mounted on the chassis, and provided, as shown in Figure 1, with a suitable power take-off connecting shaft 41; the power from the transmission of the truck mechanism being applied to the shaft 41 through a suitable power take-off lever 42 of well known construction. The hydraulic gearing 40 is controlled by a suitable valve control lever 44, shown in Figure 1, and determines the neutral, elevating, or lowering operations of the mechanism of the hydraulic motor.

The hydraulic motor 40 is of course provided with a suitable operated shaft 50 having pairs of crank arms 51 at each end of the hydraulic gear or motor which through suitable links 52 are pivotally connected at 53 with the rectangular hoist frame 30, beyond the half-way distance between the ends of the hoist frame 30, and to the rear of the latter.

It will of course be understood that through the power take-off and the hydraulic motor, the frame 30 will be elevated and lowered, and through suitable connections to be subsequently described, the skip mechanism D will be elevated to hauling position, or lowered to dumping position, as the case may be.

Referring to the skip construction D, the same may be appreciably wider than the rear end of the chassis of the truck and is designed to receive a considerable volume of material. The skip body portion is substantially triangular shape in transverse section, providing a vertical front wall 50 rounding with a small radius of curvature along its lower portion into an arcuate bottom portion 51 of greater radius and from the rear upwardly curving portion of which extends a long sloping or inclined rear wall 52ᵃ, sloping at an angle of about 45°. The skip portions 50, 51 and 52ᵃ shown in Figure 8 are formed by rolling from one piece of sheet metal. Vertical end walls 52 conforming to the transverse shape of the skip, are preferably welded to the ends of the plate forming the portions 50, 51 and 52ᵃ so as to form a one piece skip body. This specific transverse shape of the skip body portion, which substantially eliminates any definite or true bottom surface, plays an important part in insuring proper automatic dumping of the skip, and in placing the major weight of the load to the front of the skip. Suitable reinforcing angles 55 may be placed along the top edges of the front and rear walls, and also at the side walls if desired.

Each end wall of the skip structure is provided with a chain construction 60 for releasable attachment with a suitable bail of the hoisting frame 30. Each of these chains 60 is attached at 61ᵃ on the end wall of the skip at the rear top, and at 62 on the end wall at the front bottom. Each chain 60 has a connecting ring 61 intermediate its ends.

The bail mechanism, as shown in Figure 3 of the drawings, includes the side chains 70 and 71 and a bail spacing bar 72. The chains 70 and 71 at their lower ends are provided with suitable hooks 72ᵃ for connection with the rings 61 of the skip chains.

Referring again to the skip D, suitable guide or centering angles or members 80 and 81 are welded thereto and extended for a distance along the under side and upwardly along the vertical rear wall. On the under side of the skip these centering angles 80 and 81 are arranged in parallelism and spaced a distance equal to the width of the apron table 21. From the lower side of the skip these centering angles or guides 80 and 81 extend divergently upward along the outer surface of the front wall of the skip and are so spaced and arranged that as the skip is lifted into loading position, they will contact the side edges of the depending and sloping portions 23 and 22 respectively of the apron construction 20, and see that the skip is properly centered with respect to the longitudinal axis of the truck. Welded to each end of the skip, beneath the end walls 52 is an L-shaped rest or support 82 formed of angle iron of larger size than that of the guide members 80 and 81 whereby the skip will be supported upon these rests when resting on the ground. These supports 82, as will be observed, extend rearwardly for a substantial distance beneath the inclined rear wall 52ᵃ of the skip and thereby serve to prevent the approximately triangular-shaped skip from tilting during filling of the skip.

Welded or otherwise secured to the under side of the arcuate bottom portion 51 of the skip, at a location midway the ends of the skip, is a lug or bar 52ᵇ which is adapted to cooperate in the slot or opening 29 of the apron 20 for assisting in tilting the skip into load dumping position as the hoist mechanism lowers the skip for such purpose, and also retaining the skip in the load dumping position against sliding off the apron construction 20 during the dumping operation.

The operation of loading, hauling, and dumping the skip will be apparent from the foregoing. Referring to Figure 1, the loading position of the skip is shown in that view in dotted lines. These skips are adapted to be loaded at convenient points and the truck backs up until the operator can attach the bail hooks 72ᵃ in the rings or couplings 61 of the skip. In this position the hoisting frame or boom 30 is horizontal and the front of the skip is spaced slightly from the apron 20 of the truck. The hoist mechanism is set in operation to raise the hoist frame 30 and through the bail and shorter chain linkage of each chain structure at the ends of the skip, the latter will be dragged to a position where the front wall thereof will engage the rollers 27 on the apron, with the apron portion 23 disposed between the upwardly diverging centering angles 80 and 81. Further hoisting of the frame will insure that the skip will be elevated and moved upwardly over the vertical and sloping walls of the apron construction 20 until the arcuate lower wall thereof comes to rest on the horizontal portion 21 of the apron 20. Of course during this operation the centering angles 80 and 81 will center the skip sidewise on the truck. The hoist mechanism is now in the position shown in Figure 1 and in this position the major load of the skip and its weight is supported directly upon the truck and is not to any appreciable extent taken care of by the hoisting mechanism. The fact that the load is thus supported so close to the rear running gear of the vehicle, and the fact that the hoist mechanism takes some portion of the load and places it forwardly of the running gear does away with the necessity of placing large and heavy counterweights at the front of the vehicle to prevent tipping of the same during loading and haulage.

Figure 6:
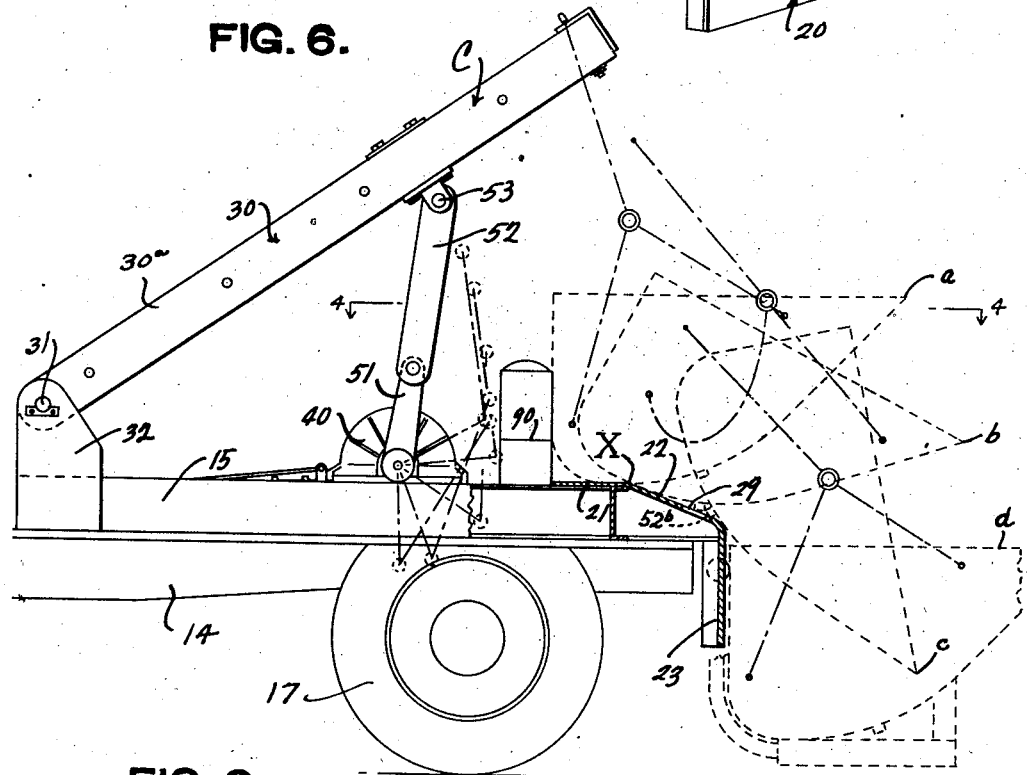
Figure 6 is a side elevation of the rear portion of the truck, showing in section the apron construction for the skip, and showing the hoisting mechanism in load hauling position; the skip structure being shown progressively (in dotted lines) in various positions between the load hauling position and the position after the load has been dumped and the skip lowered to the ground.

When it is desired to merely dump the skip at a desired location and without lowering the skip to the ground, the hoist mechanism is operated for lowering the boom 30 and the skip construction assumes progressively the different dotted positions shown at (a), (b) and (c) in Figure 6 of the drawings. During this dumping operation, it should be noted that the weight of the skip and its load is overbalanced slightly to the rear of the point (X) in Figure 6, so that the skip will rock about the point (X) as an axis and tilt from the position (a) to the position (b). It should be noted in this connection that the lug 52ᵇ plays an important part, since during initial tilting of the skip it enters the opening 29 in the apron and when the skip slides down the sloping apron portion 22, this lug will catch against the rear edge of the opening 29 and tilt the skip. This throws the load in the skip rearwardly and trips the skip to the dumping position (c), shown in Figure 6, for quickly releasing the load. The lug 52ᵇ remains in the opening 29 and after the load is released, the boom 30 may be raised for righting the skip upon the apron structure 20. When desiring to lower and detach the skip from the dumping position (c), the truck driver causes a slight jerking movement to the truck which causes the lug 52ᵇ to jump out of the opening 29. When the skip is thus released, the overbalanced rear portion of the skip will swing the skip to a horizontal position (d) where it may be lowered and detached from the bail mechanism.

Secured as by welding or other suitable means to each of the side rails 15ᵃ of the sub-frame 15, and extending upwardly above the frame at the forward edge of the horizontal apron portion 21, is a combined centering and stop post 91 which may be in the form of channels as shown in Figure 5, having the tops of the web portions thereof divergently arranged as at 92. These posts or uprights 91 serve to center and prevent side sway of the boom 30 when lowered, and also as stops or abutments against which the skip is held when in a loaded position as in Figure 1.

The boom or hoist frame 30 when lowered, rests horizontally upon suitable supporting blocks 90 preferably disposed inwardly of each upright 91. It is to be noted that the hoisting frame 30 of the unit C is in effect a chassis frame. When it is lowered and supported horizontally upon the blocks 90 as shown in dotted position in Figure 1, the vehicle may be used as any ordinary truck, since no impeding portion of the hoisting mechanism projects thereabove.

It should be noted that the lifting point of the bail on the hoist frame 30 is always to the rear of the major weight of the skip and its load. The bail and skip linkage, during a lifting operation, are at an angle upwardly and to the front.

Various changes in the shape, size, and arrangement of parts may be made to the form of invention herein shown and described, without departing from the spirit of the invention or the scope of the claims.

I claim:

1. Apparatus for transporting materials comprising a truck, a skip, and a skip handling unit on the truck including a depending rear apron and a horizontal skip supporting platform forward of the apron, hoist mechanism for elevating said skip upwardly along said apron and then forwardly to a supported position directly upon said platform, and means for automatically tilting the skip to a load dumping position as the skip is lowered by said hoist mechanism.

2. A loading apron construction for weight transporting trucks comprising a depending vertical apron portion having rollers projecting rearwardly therefrom to facilitate loading, said apron having a sloping portion above the rollers and a horizontal load supporting portion at the upper end of the sloping portion.

3. In apparatus for the loading, hauling, and transporting of materials, a truck, a skip handling unit having a rear depending vertical apron and a load supporting portion at the rear end thereof, a skip, loading means on the unit for loading the skip by dragging it upwardly against the apron onto the load supporting portion, said apron having horizontally journaled rollers projecting therethrough and engageable by the skip to facilitate the loading operation.

4. In apparatus for the loading, hauling, and transporting of materials, a truck, a skip handling unit on the truck having a rear depending vertical apron and a load supporting portion at the rear end thereof, a skip, loading means on the unit for loading the skip by dragging it upwardly against the apron onto the load supporting portion, said apron having rollers thereon engageable by a wall of the skip to facilitate the loading operation, and skip centering means on the skip adapted to cooperate with opposite ends of said apron in sidewise centering of the skip into loading position.

5. In apparatus for loading, hauling, and dumping materials a truck having a chassis, hoist mechanism including a hoist frame pivoted at its forward end intermediate the ends of the chassis, hoist means for elevating and lowering the rear end of said frame, a skip, bail connections between the skip and hoist frame for elevating the skip by dragging it upwardly against the rear end of the chassis to a loaded position on the rear end of the chassis, said skip in hauling position on the chassis being supported by the chassis and with the hoist means holding the loaded skip so that the major weight is overbalanced to the rear of the chassis whereby the skip will slide rearwardly over the chassis as the hoist means lowers the skip, and means on the skip for automatically tripping the skip as it is lowered to dumping position.

6. In apparatus for loading, hauling, and dumping materials, a truck having a chassis, a sub-frame on the chassis, hoist mechanism including a hoist frame pivoted at its forward end on the sub-frame, hoist means for elevating and lowering the rear end of said hoist frame, a skip, bail connections between the skip and hoist frame for elevating the skip by dragging it upwardly against the rear end of the sub-frame to a loaded position on the rear end of the sub-frame, said skip in hauling position being supported by the sub-frame and with the hoist means holding the loaded skip so that the major weight is overbalanced to the rear of the chassis whereby the skip will slide rearwardly over the sub-frame as the hoist means lowers the skip, and means on the skip for automatically tilting the skip as it is lowered to dumping position, said means comprising a lug on the skip and means on the sub-frame to engage the lug for tripping the skip.

7. In skip hauling, loading, and dumping apparatus, a skip, and a handling unit for the skip comprising a sub-frame, a boom pivoted upon the forward end of the frame, hydraulic gear mechanism on the frame for raising and lowering the boom, bail means on the rear end of the boom for releasable connection with the skip, an apron structure at the rear end of the frame including a horizontal skip supporting portion, an inclined tilting portion and a depending portion, and upstanding stops at the forward edge of the said supporting portion engageable by the skip when in hauling position on the unit.

8. In skip hauling, loading, and dumping apparatus, a skip, and a handling unit for the skip comprising a sub-frame, a boom pivoted upon the forward end of the frame, hydraulic gear mechanism on the frame for raising and lowering the boom, bail means on the rear end of the boom for releasable connection with the skip, an apron structure at the rear end of the frame including a horizontal skip supporting portion, an inclined tilting portion and a depending portion, said tilting portion having an opening, and a lug on the under side of the skip and movable into the opening for causing tilting of the skip when lowered by the boom toward a dumping position.

9. In a skip, and skip handling mechanism, a skip having a curved bottom portion provided with a downwardly projecting lug, and a supporting apron structure for the skip including an inclined tilting portion over which the skip rocks and having an opening receiving the lug for causing tilting of the skip to a dumping position.

10. In a loading, hauling, and dumping unit for trucks, a flat sub-frame for mounting horizontally upon the chassis of the truck, a flat hoist frame structure pivoted at one end to the forward end of the sub-frame above the upper plane of the sub-frame, hoist means for the hoist frame and mounted on the sub-frame, bail means at the rear end of the hoist frame, and rests on the rear portion of the sub-frame supporting the hoist frame in a horizontal position above the sub-frame when lowered upon the rests, said hoist means being disposed wholly below the hoist frame when the latter is lowered.

LEW WALLACE BROOKS.